(12) United States Patent
Wisnia

(10) Patent No.: US 9,536,365 B2
(45) Date of Patent: Jan. 3, 2017

(54) SYSTEM AND METHOD FOR KEYLESS ENTRY AND REMOTE STARTING VEHICLE WITH AN OEM REMOTE EMBEDDED IN VEHICLE

(71) Applicant: Lightwave Technology Inc., Ville St-Laurent (CA)

(72) Inventor: Jack Wisnia, Dollard-des-Ormeaux (CA)

(73) Assignee: LIGHTWAVE TECHNOLOGY INC., Ville St-Laurent, Quebec (CA)

( * ) Notice: Subject to any disclaimer, the term of this patent is extended or adjusted under 35 U.S.C. 154(b) by 0 days.

(21) Appl. No.: 14/290,614

(22) Filed: May 29, 2014

(65) Prior Publication Data

US 2015/0029010 A1   Jan. 29, 2015

Related U.S. Application Data

(60) Provisional application No. 61/828,424, filed on May 29, 2013.

(51) Int. Cl.
| | |
|---|---|
| *B60R 25/10* | (2013.01) |
| *G07C 9/00* | (2006.01) |
| *B60R 25/20* | (2013.01) |
| *G08C 17/02* | (2006.01) |
| *B60R 25/24* | (2013.01) |

(52) U.S. Cl.
CPC ......... *G07C 9/00309* (2013.01); *B60R 25/209* (2013.01); *B60R 25/24* (2013.01); *G08C 17/02* (2013.01); *G07C 2009/00206* (2013.01); *G07C 2009/00547* (2013.01); *G07C 2009/00793* (2013.01); *G08C 2201/93* (2013.01)

(58) Field of Classification Search
CPC ............. B60R 25/245; B60R 25/02153; B60R 25/2063; B60R 25/02; B60R 25/10; B60R 25/209; G07C 2009/0033; G07C 2009/00396; G07C 2009/00603; G07C 2009/00206; Y10T 70/5956
USPC ..... 340/426.17, 5.61, 5.72, 5.64, 5.5, 10.33; 327/517; 70/278, 252
See application file for complete search history.

(56) References Cited

U.S. PATENT DOCUMENTS

| | | |
|---|---|---|
| 5,874,785 A | 2/1999 | Liu |
| 5,937,065 A | 8/1999 | Simon et al. |
| 6,037,675 A | 3/2000 | Yoshida et al. |
| 6,218,932 B1 | 4/2001 | Stippler |
| 6,323,566 B1 | 11/2001 | Meier |
| 6,538,560 B1 * | 3/2003 | Stobbe .................... B29C 44/56 340/5.72 |

(Continued)

*Primary Examiner* — Mirza Alam
(74) *Attorney, Agent, or Firm* — Merchant & Gould P.C.

(57) ABSTRACT

A vehicle comprising a keyless go system, and at least one key fob, said keyless go system being operatively connected to a locking/unlocking subsystem and an engine start subsystem, said vehicle further comprising at least one LF transmitter, at least one LF receiver, at least one HF transmitter and at least one HF receiver, said vehicle further comprising an aftermarket keyless go system interfacing with said keyless go system, wherein at least one of said at least one key fob is embedded into said vehicle, and wherein when a user sends a lock/unlock command, or a start command with a portable device, said aftermarket keyless go system interacts with said embedded key fob to selectively enable and disable low frequency communication between said embedded key fob and said keyless go system.

8 Claims, 2 Drawing Sheets

(56) References Cited

U.S. PATENT DOCUMENTS

| | | |
|---|---|---|
| 6,662,085 B2 | 12/2003 | Chang |
| 6,714,119 B1* | 3/2004 | Mindl .................... B60R 25/24 340/5.61 |
| 6,747,545 B2 | 6/2004 | Nowottnick et al. |
| 6,960,981 B2 | 11/2005 | Blatz |
| 7,091,835 B2 | 8/2006 | Boulay et al. |
| 7,466,219 B2 | 12/2008 | Ishimura et al. |
| 7,613,551 B2 | 11/2009 | Watanabe et al. |
| 7,629,919 B2 | 12/2009 | Wilcox |
| 7,650,864 B2 | 1/2010 | Hassan et al. |
| 7,683,757 B2 | 3/2010 | King et al. |
| 7,783,451 B2 | 8/2010 | Wilcox et al. |
| 7,791,457 B2 | 9/2010 | Ghabra et al. |
| 7,808,424 B2 | 10/2010 | Wilcox |
| 7,915,997 B2 | 3/2011 | King et al. |
| 7,978,049 B2 | 7/2011 | Leitch |
| 8,077,011 B2 | 12/2011 | Mcbride et al. |
| 8,112,185 B2 | 2/2012 | Wu |
| 8,254,869 B2 | 8/2012 | Hyde et al. |
| 8,264,320 B2 | 9/2012 | Nelson |
| 8,421,589 B2 | 4/2013 | Sultan et al. |
| 8,825,224 B2 | 9/2014 | Fazi |
| 8,983,534 B2 | 3/2015 | Patel |
| 2001/0033222 A1 | 10/2001 | Nowottnick et al. |
| 2003/0222757 A1 | 12/2003 | Ghabra et al. |
| 2003/0222813 A1 | 12/2003 | Boulay et al. |
| 2004/0135435 A1 | 7/2004 | Nelson |
| 2004/0222899 A1 | 11/2004 | Yezersky et al. |
| 2005/0033484 A1 | 2/2005 | Geber et al. |
| 2005/0090952 A1 | 4/2005 | Boulay et al. |
| 2005/0168322 A1 | 8/2005 | Appenrodt et al. |
| 2006/0044108 A1 | 3/2006 | Nowottnick |
| 2006/0071555 A1 | 4/2006 | Borngraber et al. |
| 2006/0114100 A1* | 6/2006 | Ghabra .................. E05B 81/78 340/5.61 |
| 2006/0164207 A1 | 7/2006 | Wilcox |
| 2006/0266089 A1 | 11/2006 | Dimig |
| 2007/0021082 A1 | 1/2007 | Okumura et al. |
| 2007/0085658 A1* | 4/2007 | King ...................... B60R 25/24 340/5.72 |
| 2008/0042801 A1 | 2/2008 | Nelson |
| 2008/0079603 A1 | 4/2008 | King et al. |
| 2008/0106391 A1 | 5/2008 | Santavicca et al. |
| 2008/0109123 A1 | 5/2008 | Kachouh et al. |
| 2008/0284564 A1 | 11/2008 | Leitch |
| 2009/0009303 A1 | 1/2009 | Fujioka et al. |
| 2009/0133453 A1* | 5/2009 | Mueller ............ B60R 25/02153 70/252 |
| 2009/0206989 A1 | 8/2009 | Leitch |
| 2009/0206990 A1 | 8/2009 | Nelson |
| 2009/0212906 A1 | 8/2009 | Michel et al. |
| 2009/0256677 A1 | 10/2009 | Hein et al. |
| 2010/0026557 A1 | 2/2010 | Wilcox |
| 2010/0141389 A1 | 6/2010 | Hagl et al. |
| 2010/0188192 A1* | 7/2010 | Lumley .................. B60R 25/10 340/5.64 |
| 2010/0217457 A1 | 8/2010 | Georgi et al. |
| 2010/0231351 A1 | 9/2010 | Lickfelt et al. |
| 2010/0305779 A1 | 12/2010 | Hassan et al. |
| 2011/0102138 A1 | 5/2011 | Girard, III et al. |
| 2011/0102139 A1 | 5/2011 | Girard, III et al. |
| 2011/0112969 A1 | 5/2011 | Zaid et al. |
| 2011/0257817 A1 | 10/2011 | Tieman |
| 2012/0031155 A1 | 2/2012 | Shimura et al. |
| 2012/0268242 A1 | 10/2012 | Tieman et al. |
| 2012/0280788 A1 | 11/2012 | Nowottnick |
| 2012/0303182 A1 | 11/2012 | Choi |
| 2013/0079952 A1 | 3/2013 | Fazi |
| 2013/0110318 A1 | 5/2013 | Colja et al. |
| 2013/0176069 A1* | 7/2013 | Leong .................... B60R 25/24 327/517 |
| 2013/0268141 A1 | 10/2013 | Du et al. |
| 2013/0268142 A1 | 10/2013 | Du et al. |
| 2013/0268143 A1 | 10/2013 | Du et al. |
| 2013/0268144 A1 | 10/2013 | Du et al. |
| 2014/0240086 A1 | 8/2014 | Van Wiemeersch |
| 2014/0240090 A1 | 8/2014 | Mutti et al. |
| 2014/0285319 A1 | 9/2014 | Khan et al. |
| 2014/0327517 A1 | 11/2014 | Portet |

* cited by examiner

SYSTEM AND METHOD FOR KEYLESS ENTRY AND REMOTE STARTING VEHICLE WITH AN OEM REMOTE EMBEDDED IN VEHICLE

CROSS-REFERENCE TO RELATED APPLICATIONS

This application claims the benefit of priority from provisional patent application Ser. No. 61/828,424, filed May 29, 2013.

FIELD OF THE INVENTION

The present invention is directed to a system and method for keyless entry, and remote starting of a vehicle, where the vehicle has an OEM remote embedded in the vehicle.

BACKGROUND OF THE INVENTION

Vehicles were traditionally locked and unlocked, and started, with a physical key. As advances in technology were made, remote locking and unlocking became standard on many models. Remote starters, both OEM and aftermarket, are now also prevalent, and are gaining in popularity. In the area of convenience for users of vehicles, remote keyless entry and push to start systems, once reserved for higher end luxury vehicles, are now trickling down to mid-range and entry level models.

As automation and convenience features have gained in popularity, so have thieves' efforts to defeat these systems. In the field of wireless communication, encryption, and techniques such as spread-spectrum or code hopping have been adopted by car manufacturers to increase the security of these systems.

It is often desirable to provide aftermarket remote starting and remote locking and unlocking of the vehicle. In order to maintain the integrity of the OEM system, aftermarket providers are often required to leave an OEM remote FOB inside the vehicle, hidden. This is becoming an irritant for users as they must purchase an extra OEM remote, which are expensive, in part because of the security that is embedded in them.

SUMMARY OF THE INVENTION

It is therefore an object of the invention to provide a system and method to allow keyless entry and remote starting of a vehicle, without requiring the user to carry an extra FOB which includes the OEM FOB. The user utilizes his own remote A for authentication in order to unlock/lock the vehicle while entering/exiting the vehicle without the need of an OEM remote B which is embedded in the vehicle. The same remote A is used for authentication inside the vehicle for the purpose of starting the engine by pushing the start button or turning a knob in the vehicle. The user's remote A remains in the user's pocket.

Among the advantages of the invention, it will appear to a person skilled in the art that no FOB of any kind is required to unlock/lock the vehicle. A GSM phone or a device that contains a Bluetooth or Wifi transceiver can also start the car.

If device A is a key fob, only one key fob is required for to unlock/lock and remote start. In a growing number of cars, an antitheft bypass simulating the OEM fob security features is not available. Embedding an existing OEM remote B and using the system and method of the present invention enables all users of the vehicle to carry only a single device, and avoids the purchase of another key fob, which is potentially quite expensive and time consuming.

In accordance with a first aspect of the invention, there is provided a keyless entry system for a vehicle, said vehicle being provided with an OEM remote inside a vehicle, said keyless entry system being operatively connected to a security system of said vehicle, said keyless entry system being adapted to selectively block low frequency transmissions from said security system to said OEM remote when said security system receives an indication that a user unlocks said vehicle, in order to permit locking or unlocking of said vehicle, or remote starting of said vehicle.

In accordance with a second aspect of the invention, there is provided a vehicle comprising a keyless go system, and at least one key fob, said keyless go system being operatively connected to a locking/unlocking subsystem and an engine start subsystem, said vehicle further comprising at least one LF transmitter, at least one LF receiver, at least one HF transmitter and at least one HF receiver, said vehicle further comprising an aftermarket keyless go system interfacing with said keyless go system, wherein at least one of said at least one key fob is embedded into said vehicle, and wherein when a user sends a lock/unlock command, or a start command with a portable device, said aftermarket keyless go system interacts with said embedded key fob to selectively enable and disable low frequency communication between said embedded key fob and said keyless go system.

In accordance with a third aspect of the invention, there is provided an aftermarket keyless go system interfacing with an on-board keyless go system in a vehicle, said aftermarket keyless go system interacting with an aftermarket remote starter, said aftermarket keyless go system being adapted to interact with said on-board keyless go system, said vehicle being provided with an OEM key fob embedded inside said vehicle, in order to permit a user to start said vehicle by pressing a predetermined sequence of keys on said aftermarket remote starter, causing said aftermarket keyless do system to selectively enable/disable said OEM key fob.

BRIEF DESCRIPTION OF THE DRAWINGS

The present invention will be better understood after having read a description of a preferred embodiment thereof, made in reference with the following drawings, in which.

DESCRIPTION OF A PREFERRED EMBODIMENT OF THE INVENTION

In the following description of a preferred embodiment of the invention, the following terms and expressions are used:
1. IAM—Independent aftermarket
2. Device A: either one of the following
   a. IAM key fob
   b. Mobile phone with Bluetooth or Wi-Fi
   c. Other device with Bluetooth or Wi-Fi
   d. Any other device that is adapted to effect bi-directional communication with the vehicle and offers positive identification, such as RFID.

Figure 1:
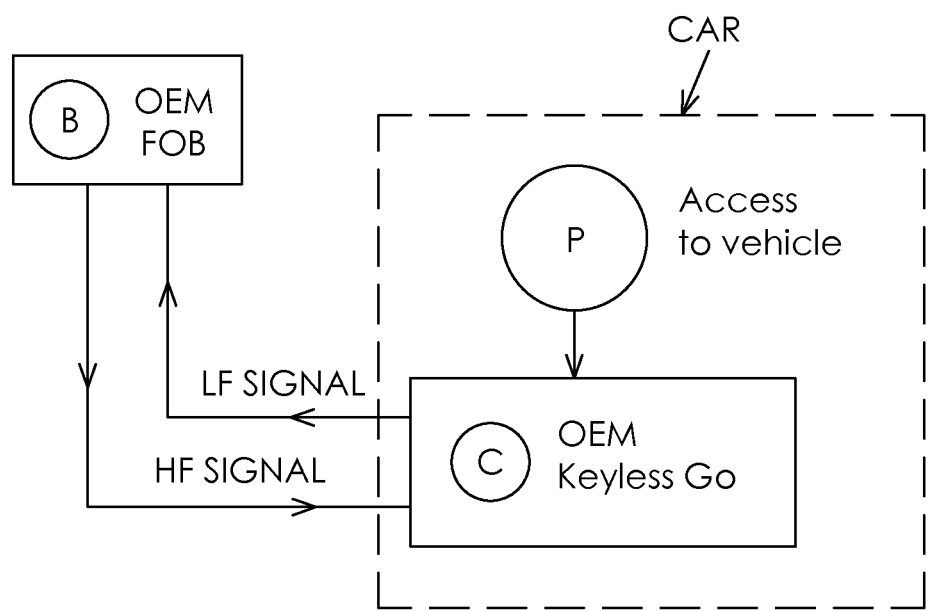
FIG. 1 is a schematic representation of a prior art system.

3. Device B—OEM key fob
4. Device C—OEM Keyless Go system in vehicle
5. Device D—IAM keyless go system
6. LF receiver—device that receives coded low-frequency RF signal in the low frequency range typically 125 kHz
7. LF transmitter—A device that transmits coded low-frequency RF signal in the low frequency range typically 125 kHz
8. HF transmitter—Device that transmits a coded high-frequency RF signal in the high-frequency range typically 300 MHz AM or FM
9. Access P—a pushbutton on the handle of the vehicle door or a touch sensor inside the door handle allowing the user to unlock/lock the vehicle door
10. KG—Keyless Go Normal Operation The general operation of common keyless go systems which uses RFID is as follows [see FIG. 1]:

The OEM remote B contains a LF receiver and a HF transmitter.

The user approaches the car and activates the door entry system by pulling on the door handle or pressing a pushbutton on the door handle. This action activates the OEM KG system C to transmit a challenge to the OEM remote B by sending a LF transmission to the OEM remote B asking for authentication. OEM remote B upon receiving request, responds by sending an HF radio response to the KG system C which contains a HF receiver. The KG system C authenticates the response and unlocks the door. Similarly the same authentication process occurs when the user sits in the vehicle and pushes the start button to start the vehicle.

Preferred Embodiment

Figure 2:
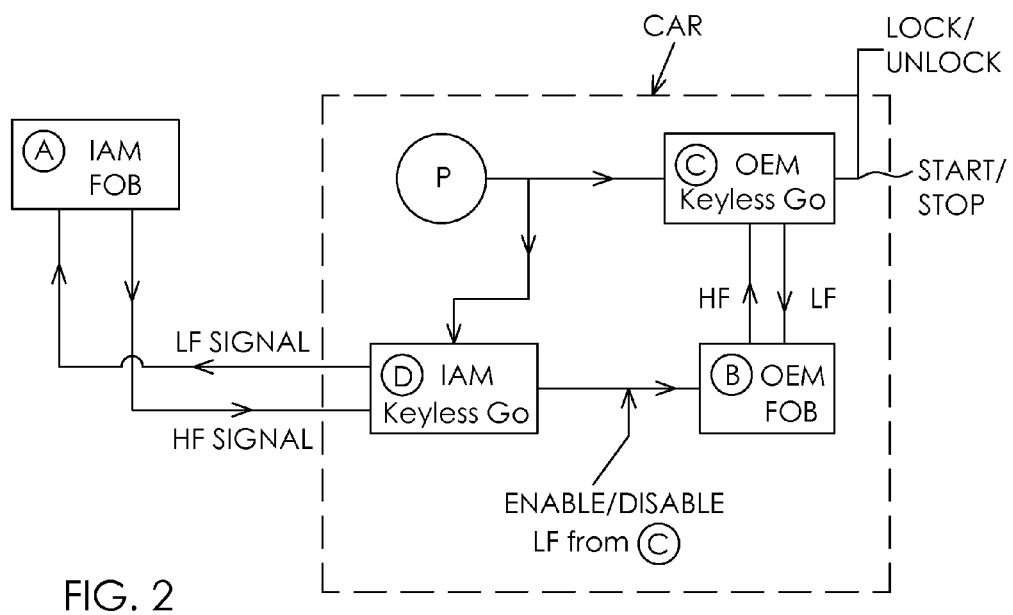
FIG. 2 is a schematic representation of a preferred embodiment of the present invention.

In one preferred embodiment illustrated in FIG. 2, the invention concerns an improvement over the above described system, where an OEM remote is embedded inside the vehicle. Remote B is in communication with system C by wire or wireless means.

System C along with remote B authenticates key fob A providing key fob A is close enough to the vehicle allowing unlocking/locking and remote start. In a sense, system C, remote B and device A are "paired", in that device A is registered with system C and remote B.

System D is an IAM module that is embedded in the vehicle. Module D contains an HF receiver and an LF transmitter. Upon receipt of a signal from the pushbutton of the car, System D then sends an LF signal to remote A. Remote A upon receipt of LF signal then transmits a HF signal to system D. System D authenticates Remote A as a valid user.

When the pushbutton of the car is pressed, system C tries to communicate with OEM remote B seeking authentication. System D controls OEM remote B by blocking or unblocking the LF signal from system C, or enable/disable the power supply of remote B.

If System D does not authenticate remote A it will block the OEM remote from receiving the LF signal from system C. This prevents any random user to gain entry unless he has Remote A.

It is important to note that system C will still work with any user that has an OEM remote.

A similar process ensues when the user wants to start the car.

Locking the Car

Most cars will not allow the user to lock the car using Access P, while the OEM remote is inside the vehicle.

The KG system A has two LF transmitting antennae. On each action by the user, the car sends transmissions from each antenna in sequence separated by a certain time interval. Each antenna has a different power level. The second antenna with the lower power level will only get a response if the OEM remote is inside the car. The first antenna with a higher power level will get a response of the OEM remote is outside the car. By sending sequential signals and analyzing the response signals, the system can determine whether the remote is inside the car or outside the car. This way the user can lock the car by using access P and not leave the OEM remote inside the car.

In the aftermarket system of the present invention, system D will block the lower power antenna transmission, or disable power supply of OEM remote during the low power antennae transmission, so that the OEM remote does not respond, in effect tricking the car into thinking that the OEM remote is outside the car (because the OEM remote will respond to the higher power antenna).For this system to work, system D must be synchronized with the antenna signals.

Using an Embedded OEM Remote as an Extra Key

Figure 3:
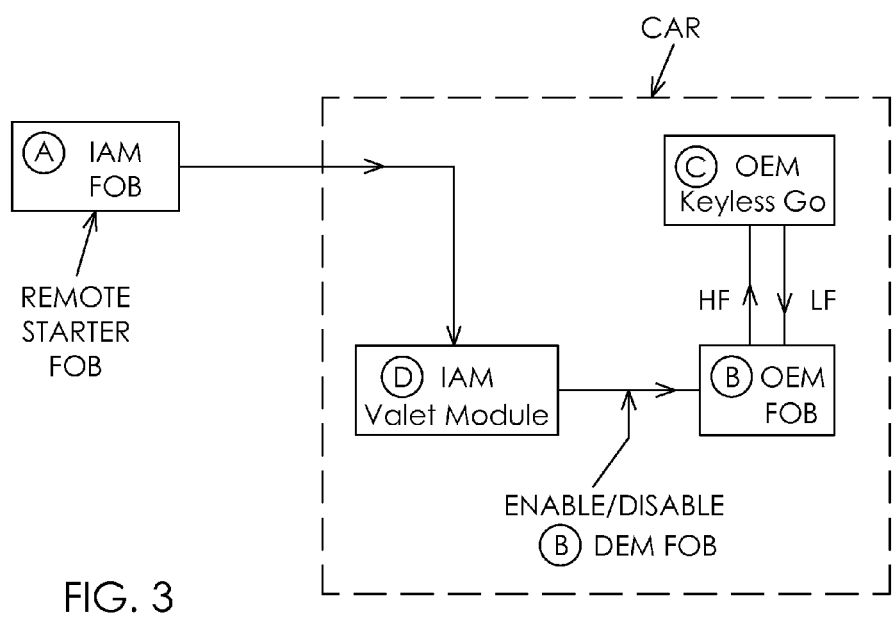
FIG. 3 is a schematic representation of another preferred embodiment of the present invention, particularly as a "valet" system, or a back-up system in case a user has lost an OEM key fob.

In this case, as illustrated in FIG. 3, the installer has chosen to embed an OEM remote as a bypass because a data bypass is not available. This is quite common. What is proposed is a novel solution to a case where the user has lost his primary OEM remote. Using the method described earlier where system D can enable/disable the OEM remote B, the user can enable the OEM remote B by using his remote starter remote A using a predetermined sequence of key presses. Note that enabling/disabling OEM remote B can be done in a variety of ways such as blocking LF signals or disabling the power supply, among others, as is known to a person skilled in the art.

For example if the user has lost his primary remote. The user unlocks the car with his remote starter remote A, and uses the predetermined sequence of button presses to enable the OEM remote. The car will recognize that the OEM remote is inside the vehicle and allow the user to start the vehicle. In this embodiment the remote starter remote A does not have to be a RFID remote since the only authentication that takes place between Remote A and Module D is the RF signal with the predetermined button presses.

Although the present invention has been explained hereinabove by way of a preferred embodiment thereof, it should be pointed out that any modifications to this preferred embodiment within the scope of the appended claims is not deemed to alter or change the nature and scope of the present invention.

The invention claimed is:

1. A vehicle comprising a keyless go system, and at least one OEM key fob, said keyless go system being operatively connected to a locking/unlocking subsystem and an engine start subsystem, said vehicle further comprising at least one LF transmitter, at least one LF receiver, at least one HF transmitter and at least one HF receiver and first and second LF transmitting antennae, said vehicle further comprising an aftermarket keyless go system interfacing with said keyless go system, wherein the keyless go system is configured to transmit signal from each antenna in sequence separated by a certain time interval with a higher and lower power levels, respectively, wherein the second LF antenna with the lower power level will only get a response if the OEM key fob is inside the vehicle, and the first antenna with a higher power level will get a response if the OEM key fob is outside the vehicle, and, by analyzing the response signals to the sequential signals, to determine whether the OEM key fob is inside the vehicle or outside the vehicle, said aftermarket keyless go system being adapted to communicate with a portable device that is different from said OEM key fob, wherein at least one of said at least one OEM key fob is embedded into said vehicle, and wherein the keyless go system is further configured to, when a user unlocks the vehicle with the portable device, to enable the OEM key fob when the user uses a predetermined sequence of button presses on the portable device, whereby the vehicle recognize that the OEM key fob is inside the vehicle and allow the user to start the vehicle, wherein when a user sends a lock/unlock command with said portable device, said lock command is received by said aftermarket keyless go system, such that said aftermarket keyless go system subsequently interacts with said embedded OEM key fob to selectively enable and disable low frequency communication between said embedded OEM key fob and said keyless go system, such that said user is free from being required to carry another of said at least one OEM key fob simultaneously with said portable device.

2. A vehicle according to claim 1, wherein said LF transmitter and LF receiver are an LF transceiver.

3. A vehicle according to claim 1, wherein said HF transmitter and HF receiver are an HF transceiver.

4. A vehicle according to claim 1, wherein said selective enabling and disabling of low frequency communication between said embedded key fob and said keyless go system include selectively removing power from said embedded key fob.

5. A vehicle according to claim 1, wherein said portable device is a cellular telephone, a smart phone, a tablet, or an aftermarket key fob, in wireless communication with said aftermarket keyless go system.

6. A vehicle according to claim 1, wherein said lock command is triggered by a user pressing a pushbutton on a handle of a vehicle, or touching a touch sensor on an inside of said handle of said vehicle.

7. A vehicle according to claim 1, wherein said start command is triggered by a user pressing a start button inside said vehicle.

8. A vehicle according to claim 1, wherein said aftermarket keyless go system further includes a remote starter, in order to permit a user to start said vehicle with said portable device.

* * * * *